(12) United States Patent
Tatton et al.

(10) Patent No.: US 7,477,145 B2
(45) Date of Patent: Jan. 13, 2009

(54) AIRPORT OPERATIONS MONITORING SYSTEM

(75) Inventors: Stephen C. Tatton, Spring, TX (US); Larry G. Buford, Humble, TX (US)

(73) Assignee: John Bean Technologies Corporation, Chicago, IL (US)

( * ) Notice: Subject to any disclaimer, the term of this patent is extended or adjusted under 35 U.S.C. 154(b) by 335 days.

(21) Appl. No.: 11/325,025

(22) Filed: Jan. 4, 2006

(65) Prior Publication Data

US 2007/0156635 A1    Jul. 5, 2007

(51) Int. Cl.
*G08B 1/00* (2006.01)
*G08B 21/00* (2006.01)
*G06F 7/00* (2006.01)
*G05D 1/00* (2006.01)

(52) U.S. Cl. .................. 340/531; 340/945; 340/963; 701/3; 701/14; 701/120; 705/13

(58) Field of Classification Search .......... 340/531, 340/945; 701/120
See application file for complete search history.

(56) References Cited

U.S. PATENT DOCUMENTS

| | | | | |
|---|---|---|---|---|
| 6,161,097 A * | 12/2000 | Glass et al. | .................... | 705/6 |
| 6,282,488 B1 * | 8/2001 | Castor et al. | ................ | 701/120 |
| 2003/0055689 A1 * | 3/2003 | Block et al. | .................... | 705/5 |
| 2003/0105579 A1 * | 6/2003 | Walter | ........................ | 701/120 |
| 2005/0071076 A1 * | 3/2005 | Baiada et al. | ................ | 701/120 |

\* cited by examiner

*Primary Examiner*—Donnie L Crosland

(57) ABSTRACT

A system for monitoring aircraft/airport operations includes a controller operatively coupled to a network, a data storage device comprising flight information data that is operatively coupled to the network, a data storage device comprising gate information data that is operatively coupled to the network and at least one user interface wherein a user may access the flight information data and the gate information data. A method of monitoring airport operations includes accessing a single integrated system having access to flight information data and gate information data and monitoring at least one activity relating to airport operations based upon information accessed in the single integrated system.

32 Claims, 3 Drawing Sheets

22

| Flight Info | | |
|---|---|---|
| FL# | DT | EAT |
| 1238 | 1345 | 1808 |
| 108 | 1440 | 1810 |
| 259 | 1102 | 1825 |

22a

| Gate Info | | |
|---|---|---|
| GT# | ST | PL |
| 12 | Busy | 2 |
| 13 | Open | 3 |
| 25 | Open | 1 |

22b

| Grd Power Supply | |
|---|---|
| GT# | Status |
| 12 | In use |
| 13 | Ready |
| 25 | OOS |

22d

| Bag Hand Equip | |
|---|---|
| GT# | Status |
| 12 | In use |
| 13 | Ready |
| 25 | Ready |

AIRPORT OPERATIONS MONITORING SYSTEM

BACKGROUND OF THE INVENTION

1. Field of the Invention

The present invention is generally related to the field of computerized monitoring, data gathering and data processing systems, and, more particularly, to a computerized airport/aircraft operations monitoring system that monitors information that may include flight information data, gate information data, airport/airline ground support equipment data and facilities data in a single integrated system and allows processing of this data (into operational and management processes for the betterment of operations, processes and services).

2. Description of the Related Art

Managing airport operations is a very complex matter involving many factors. Coordination of the actions of many people and equipment is required to insure that flight operations are conducted in an efficient manner. Additionally, airline companies are constantly under tremendous pressure to reduce costs and improve the overall efficiency of all airport operations as they relate to aircraft and equipment handling.

Traditionally, airports and/or airlines may employ many separate and independent monitoring systems for monitoring airport/aircraft operations. For example, an airline/airport may employ a separate system for monitoring flight information, a separate gate management system for tracking various aspects associated with the gates where aircraft are supported and serviced and at which equipment will load and offload passengers, a separate baggage management system for tracking various aspects of the baggage handling system, a separate facilities management system for tracking facility systems such as HVAC, lighting controls, people movers and, in some cases, a separate system for tracking airline/airport ground operations equipment. The flight information system is generally used to keep track of the details of arrival and departure times at the gate(s) (both expected and actual) of aircraft. The separate gate management system is used to determine the status of a particular gate, i.e., is it occupied or open, and the expected time that the gate will be available for the next scheduled aircraft. The system is also used to track the operational condition of the equipment, it will show alarm conditions, operation status, hours of operation, i.e., personnel charged with the responsibility of managing airport/aircraft operations have to consult all of these five separate systems in making various decisions as to what aircraft are routed to which gates, when such gates were available and the arrival of the aircraft at the destination airport.

As indicated above, this is a very complex problem that must take into account many interrelated factors. As many frequent travelers know, despite the best efforts of airline personnel, there are occasions when such a system breaks down as it relates to the efficient delivery of service to the traveling public. The results of such delays are reflected in planes having to remain at the gate for unscheduled periods of time on the ground away from a gate for extended periods of time until a gate becomes available. Even then, there may be delays associated with various support equipment and personnel as it relates to fully servicing the aircraft and providing required devices to the passengers. As examples, using the prior art systems, delivery of baggage to the traveling public might be delayed or prevented due to baggage system outages or unavailability of baggage unloading equipment, food and beverage vendors may not be available to restock supplies on the aircraft, and fuel trucks may not be available to rapidly refuel the airplane for its next trip.

As indicated above, the airline industry is under constant pressure to reduce costs. For example, on an airplane, an Auxiliary Power Unit (APU) supplies electrical power to the aircraft and allows the airpacks to cool/or heat the aircraft to insure passenger comfort. The APU is a small auxiliary turbine engine on the aircraft, e.g., a rear tail engine, that is very expensive to operate, e.g., on the order of approximately $75 per minute for fuel and maintenance. Ideally, when a plane arrives at a gate, a ground power unit (GPU) is promptly coupled to the airplane, thereby providing a source of electric power for the entire airplane. Additionally, a ground-based air conditioning unit, if available, may be used to air condition the aircraft. The prior art systems did not provide an effective management system for insuring that all such related activities were performed in a coordinated manner such that services could be delivered to the traveling public in a timely and cost-efficient manner.

The present invention is directed to various methods for solving, or at least reducing the effects of, some or all of the aforementioned problems.

SUMMARY OF THE INVENTION

The following presents a simplified summary of the invention in order to provide a basic understanding of some aspects of the invention. This summary is not an exhaustive overview of the invention. It is not intended to identify key or critical elements of the invention or to delineate the scope of the invention. Its sole purpose is to present some concepts in a simplified form as a prelude to the more detailed description that is discussed later.

An integrated system for monitoring airline/airport operations is disclosed. In one illustrative embodiment, the system comprises a controller operatively coupled to a network, at least one data storage device that is operatively coupled to the network, the data storage device comprising flight information data and gate information data, and at least one user interface wherein a user may access the flight information data and the gate information data.

A method of monitoring operations is also disclosed which comprises, in one illustrative embodiment, accessing a single integrated system having access to flight information data and gate information data and monitoring at least one activity relating to aircraft/airport operations based upon information accessed in the single integrated system.

In another illustrative embodiment, the method comprises accessing a single integrated system having access to flight information data, gate information data and gate scheduling data, monitoring at least one activity relating to aircraft/airport operations based upon information accessed in the single integrated system and taking at least one corrective action based upon the monitoring of the at least one activity.

In yet another illustrative embodiment, the method comprises accessing a single integrated system having access to flight information data and gate information data and establishing rules within the system to identify exception conditions that occur within the system.

BRIEF DESCRIPTION OF THE DRAWINGS

The invention may be understood by reference to the following description taken in conjunction with the accompanying drawings, in which like reference numerals identify like elements, and in which:

FIG. 2 is an illustrative example of representative types of information that may be presented to a user of the system described herein.

Figure 1:
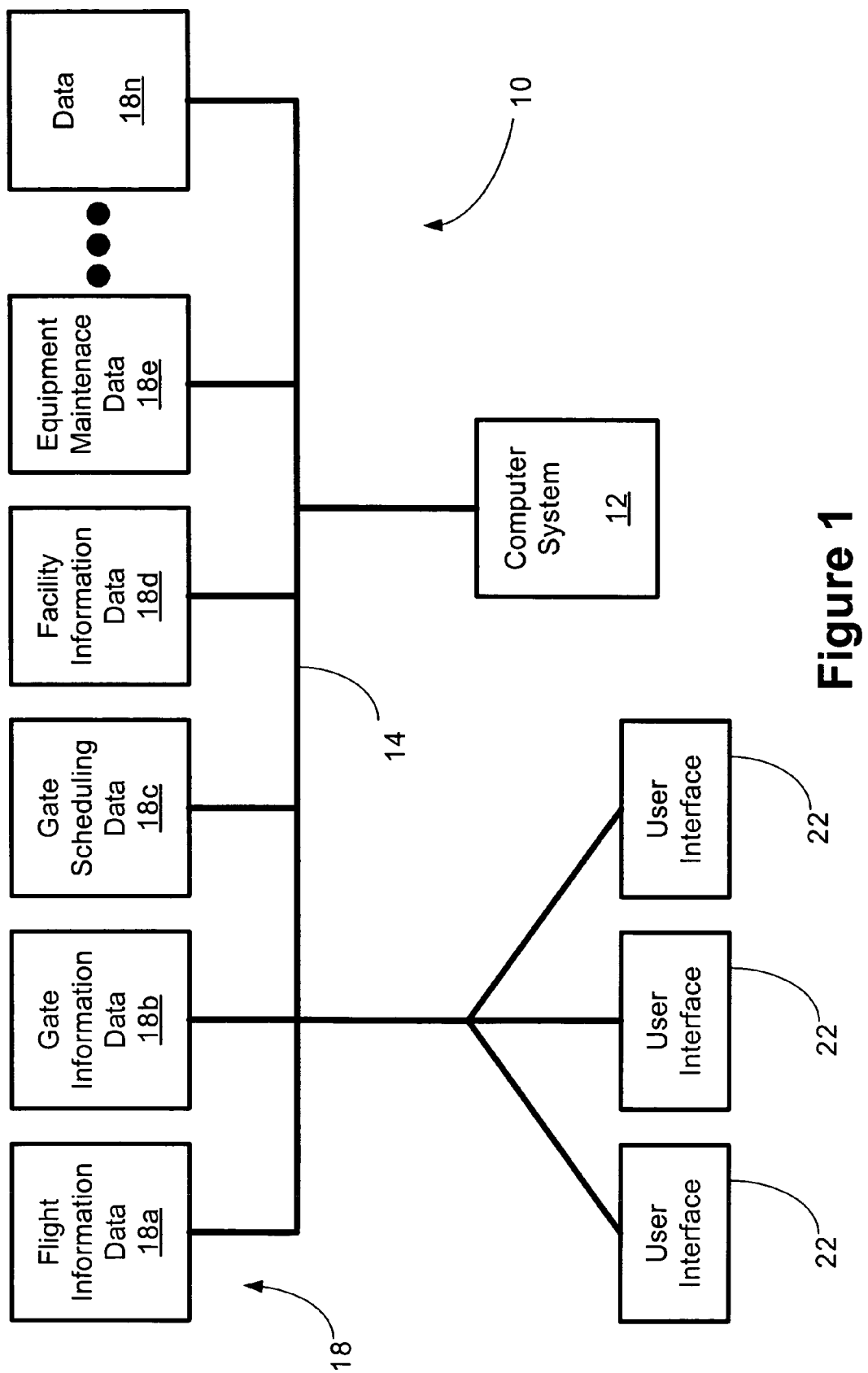
FIG. 1 is a schematic depiction of an illustrative system in accordance with one illustrative embodiment of the present invention.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF THE INVENTION

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

The present invention will now be described with reference to the attached figures. The words and phrases used herein should be understood and interpreted to have a meaning consistent with the understanding of those words and phrases by those skilled in the relevant art. No special definition of a term or phrase, i.e., a definition that is different from the ordinary and customary meaning as understood by those skilled in the art, is intended to be implied by consistent usage of the term or phrase herein. To the extent that a term or phrase is intended to have a special meaning, i.e., a meaning other than that understood by skilled artisans, such a special definition will be expressly set forth in the specification in a definitional manner that directly and unequivocally provides the special definition for the term or phrase.

In one illustrative embodiment, the present invention is directed to a fully integrated aircraft and airport operations monitoring system 10 that allows cost-efficient and effective monitoring of aircraft/airport operations. As indicated in FIG. 1, the system 10 generally comprises a computer system 12 connected to a network 14 that may be accessed by a plurality of users via the schematically depicted user interface devices 22. The system 10 uses a variety of different types of data, generally indicated by the reference number 18, in a single integrated computerized system to efficiently monitor aircraft/airport operations. In the illustrative embodiment depicted in FIG. 1, the system 10 has access to flight information data 18*a*, gate information data 18*b*, gate scheduling data 18*c*, facility performance data 18*d*, equipment maintenance data 18*e*, and other forms of data generally indicated by the box 18*n*. As will be recognized by those skilled in the art after a complete reading of the present application, the present invention may employ a vast variety of different types of data in performing the activities described herein. Thus, FIG. 1 indicates a generic data source 18*n* that is intended to reflect that the types of data supplied to the system 10 may be virtually limitless as long as it provides data useful in monitoring at least some aspect of aircraft/airport operations and is tied to streamlining operations and thus cost savings relative to aircraft operations. Of course, the present invention is not limited to use of data from all of the sources identified in FIG. 1. The scope of the present invention is set forth in the appended claims.

The system 10 is configured such that it can provide the users with an effective way of monitoring aircraft/airport operations. For example, in one illustrative embodiment, the system 10 employs standardized Ethernet network protocols (10/100/1000) to allow efficient connection to various information systems, database servers and personal computers throughout the system 10. In one embodiment, the database servers and other components of the system 10 should be off-the-shelf configurations that require no special hardware configurations to insure ease of use and reduce the initial capital costs of implementing the system 10. The information provided by the system 10 (as described more fully below) can be distributed to any communication device, e.g., a personal computer, a pager, a cell phone, a Blackberry™ device, email, or any other Web-enable communication device. In some cases, the information provided by the system 10 may be password protected. The system 10 is also scalable in that any practical number of users may access and use the system 10. The users may access the network via direct connect to the system 10 or via the worldwide web using a virtual private network (VPN) connection or other remote connection options.

Access to the system 10 by the users will generally be password protected. The system 10 is capable of allowing users 16 to customize the type of information they receive from or access on the system 10. For example, depending upon the responsibilities of the user, different types of information may be more valuable to a particular user. The system 10 also contains security levels such that particular individuals are only allowed access to certain types of information on the system 10. Depending upon the access level of the individual user, the user may access any appropriate information on the system 10. In general, it is believed that most users will tend to customize the information they desire to receive on a normal basis from the system 10. The users are able to access the system 10 (including any individually customized information) from any computer which has local or wide area network access.

The flight information data 18*a* indicated in FIG. 1 may be any type of data related to the operation of the aircraft. More specifically, as used herein, the term "flight information data" shall be understood to mean information related to the movement, location, arrival time, departure time, origination site, destination site, APU status, door status (open/closed), aircraft type, flight number, or condition of the aircraft, either actual, scheduled or predicted. For example, flight information data 18*a* may include weather conditions, flight number, scheduled departure time, actual departure time, the gate at which the airplane is parked, delay times for gate arrivals, gate departures, takeoffs, landings, anticipated or actual gate arrival times and anticipated or actual gate push-back times, the duration and use of the power unit (APU), such as when the APU was turned off and/or on, etc. Of course, the illustrative identified examples of flight information data are provided by way of example only and should not be considered a limitation of the present invention.

The gate information data 18*b* depicted in FIG. 1 may also comprise data or information regarding various items, service and/or equipment associated with gate operations. More specifically, the term "gate information data" shall be understood to mean information related to all equipment attached or adjacent to the gate used for cooling/heating provisioning of, or providing power to the aircraft when parked at the gate. In general, the gate information data 18b may be comprised of data regarding fixed equipment at the gate and mobile equipment and services required to perform various activities associated with servicing the aircraft for its arrival and departure. For example, the gate information data 18b may include information such as whether a gate is occupied or available. The gate information data 18b may also include information regarding the capability and availability of boarding bridges, ground-based power units (GPUs—e.g., 400 Hz power units), ground-based air conditioning systems, potable water, etc. Examples of mobile equipment and services that may be included in the gate information data 18b include, but are not limited to, the status and availability of cargo loaders, aircraft tractors, deicing vehicles and systems, passenger steps, transporters, 400 Hz ground-based mobile power units, mobile air conditioning and heating units, ground start units and provisioning equipment.

The system 10 may also access information regarding gate scheduling data, as indicated in FIG. 1. The term "gate scheduling data" shall be understood to mean data regarding scheduling aircraft with gates on a planned or actual usage basis. In general, the gate scheduling data 18c may include information regarding the availability of a gate, the size or type of aircraft one or more available gates can accommodate, the expected time when a gate will become available, the operational condition of the gate and associated equipment, etc.

As depicted in FIG. 1, the system 10 may also access facilities information data 18d. As used herein, the term "facilities information data" shall be understood to mean data relating to the use, operation or condition of an operational or emergency condition of all or a portion of an airport. For example, facilities information data may include the status of various lighting and air conditioning systems within all or a given section of an airport terminal. As an example, if it is determined that a particular portion of a terminal is not being used, i.e., late at night, the system 10 may be employed to turn off or reduce light and/or air conditioning services to such sections, thereby reducing the costs of operating the terminal. In other embodiments, the system 10 may be employed to indicate that such facilities may be reduced or stopped. The facilities information data could also show if a security or fire alarm was going off in any part of the facilities and propose another gate to be used, thereby reducing delays and cost.

The system 10 may also access equipment maintenance data 18e, as illustratively depicted in FIG. 1. As used herein, the "equipment maintenance data" shall be understood to mean data relating to the maintenance of equipment (current, historical or planned) used in airport operations. For example, the equipment maintenance data 18e may include information regarding the maintenance history of various items of equipment that will be used to service the aircraft, including, for example, the last time the equipment was subjected to a general maintenance procedure, the time until the particular equipment is scheduled for a particular maintenance procedure, any notes regarding particular limitations or use of a particular piece of equipment, e.g., limited capacity due to a temporary maintenance problem, etc. This type of information may allow a user to determine which types of equipment may or may not be appropriate for servicing a particular aircraft. For example, the equipment maintenance data 18e may include information that indicates that a particular ground air conditioning unit is not up to full operational capability, but it can be used on aircraft that demand less than full operational capability.

The system 10 is designed to store information for an extended length of time, e.g., 6-12 months, 5-10 years, etc. Such historical data may be useful as it relates to determining trends in various monitored activities. The system 10 may be designed to handle information regarding any number of flights. For example, the system 10 may be capable of handling and monitoring gate information data with respect to 100 gates and flight information data for 10,000 flights.

The data 18 depicted in FIG. 1 may be stored at multiple locations and accessed by the system 10 as information is needed. For example, the flight information data 18a may be maintained by the companies that operate the aircraft, while the gate information data 18b may be maintained on a system at a particular airport terminal. The system 10 is capable of accessing such data whenever it is needed or desired via the network 14.

The information on the system 10 may be updated by a variety of known techniques. For example, supervisors may monitor the status of ground-based equipment and input its status, e.g., "busy" or "available," by keystroke entry or a wireless handheld device or at a computer terminal positioned at various locations around an airport terminal. Flight information data may be updated by the aircraft operating companies on a more or less continuous basis. After reading the present application, those skilled in the art will appreciate that the information contained within the system 10 may be updated using a variety of known techniques.

The present system 10 enables one or more users to monitor desired activities such that airport operations may be conducted in a more efficient and cost-effective manner. The information may be presented to a user using any desired technique or devices, e.g., a graphical user interface (GUI) 22. The information provided to the user may include information such as equipment or gate usage, equipment or gate status, operational statistics and operational alarms, etc. FIG. 2 depicts a layout of an illustrative graphical user interface 22 depicting one illustrative arrangement of exemplary information from the system 10. As shown therein, the GUI 22 depicts flight information 22a, gate information 22b, the status of baggage handling equipment 22c, and the status of ground power systems 22d.

For example, the flight information 22a may contain information such as flight number (FL#), departure time (DT) and estimated arrival time (ETA). Although it is not depicted, the flight information 22a may also contain information as to actual arrival time (AAT), etc. The gate information may indicate the gate number (GT#), the status (occupied or open) of the gates, and a code for the size and type of planes the gate may accommodate (PL). The baggage handling equipment information 22c may indicate the status of the baggage handling equipment at a particular gate (GT). The GUI 22 may also display information indicative of the status of ground power units (GPU) as well as their present location. Again, any particular user may customize the type of information that is important to that particular user. When a single screen presents a user with most if not all of the information that may impact various decisions, the decision making process becomes more efficient and effective. By having flight information data 18a and gate information data 18b integrated into a single system 10, the management of aircraft/airport operations becomes much more effective. Although the single screen may display all of the high level pertinent information, the system 10 also includes the capability of allowing a user to investigate, i.e., "drill down," into more detailed aspects of the system 10, e.g., non-operational status, so that the cause and effect of any problem can be established quickly, efficiently and effectively.

Another aspect of the present invention is the capability of the system 10 to generate any of a variety of reports for the users. The system 10 may be provided with certain standardized reports that are believed to be universally important to all airline operations, e.g., gate turnaround time (effect on arrival and departure), baggage handling times (both loading and unloading), etc. In general, the present system 10 may also be configured to generate customized reports. For example, the present system 10 may be employed to generate a report identifying the equipment and personnel involved in the maintenance of baggage handling activities when performance falls below acceptable levels. The system would also produce exception reports for events that fall out of an predefined criteria. One of those reports might be to show all the aircraft used on a given day that ran their APU more then 10 minutes when parked at the gate Of course, software may need to be written to enable the system 10 to generate any non-standardized reports that are not included as part of the base system 10.

Another aspect of the present invention that is very useful is the ability to configure the, system 10 for the reporting of exception conditions or events. An exception condition generally refers to a condition or event that is beyond or outside some preselected allowable criteria or threshold. For example, based on historical information, an airline may deem it to be acceptable if the ground power unit (GPU) is connected to the aircraft within 3 minutes of aircraft arrival at the gate. Anything falling outside of this allowable limit would be indicated as an exception condition by the system 10. As another example, it may be deemed acceptable if all baggage is offloaded from the aircraft within 10 minutes after the aircraft is parked at the gate. Anything beyond 10 minutes would be indicated as an exception condition. Moreover, the exception conditions themselves may reflect a priority within themselves. For example, an exception condition indicating that a ground power unit has not been coupled to a parked aircraft 15 minutes after arrival will be indicated as a higher priority as compared to a situation in which the ground power supply was not hooked up to the aircraft 7 minutes after arrival. Moreover, priorities may be assigned among different types of exception conditions. For example, exception conditions related to baggage handling may be given a lower priority relative to exception conditions involving delays in coupling the ground power unit (GPU) to the aircraft, or vice versa. These various rules may be established based upon various historical operating data and by the desires of the personnel in charge of airport and airline operations.

Exception condition reporting involving use of the integrated system 10 with access to both flight information data 18*a* and gate information data 18*b* will make management operations more effective. Once the appropriate rules are established, management personnel can react to identified exception conditions highlighted by the system 10. As long as no exception conditions are occurring, the system 10 is assumed to be operating within the parameters established by the various rules. Once an exception occurs, the system 10 can indicate that the exception has occurred and notify the appropriate personnel. This exception notification can take many forms, e.g., an alarm, flashing data on a user's graphical user interface 22, a text message to a cell phone or pager, or any combination of those items listed above. Once the exception condition is identified, personnel may take appropriate corrective action to eliminate the exception condition and return the system 10 to normal operating conditions.

Rules may also be provided in the system software for notifying various levels of management of the exception conditions depending upon the number, type and/or severity of the exception conditions. If a great number of exception conditions are occurring, or if they are significant in terms of magnitude, or if they are of critical importance, the system 10 may issue an exception condition notification to the very highest level executives by way of email and/or a text message to the executive's cell phone.

The system 10 may also be provided with the capability to temporarily change or modify the various exception rules established for the system 10. For example, in extremely bad weather, e.g., a rain storm or snow storm, it is very likely that delays will naturally occur. In that situation, the rules may be modified such that the acceptable time for coupling a ground power unit to the aircraft may be deemed acceptable if it occurs within 6 minutes instead of 3 minutes. The point being that the system 10 is flexible enough to provide airport operational personnel with meaningful data even in times when there will be uncontrollable delays throughout the system 10. Of course, personnel that have the authority to modify the rules established for the system 10 may be limited to a very small group.

Figure 3:
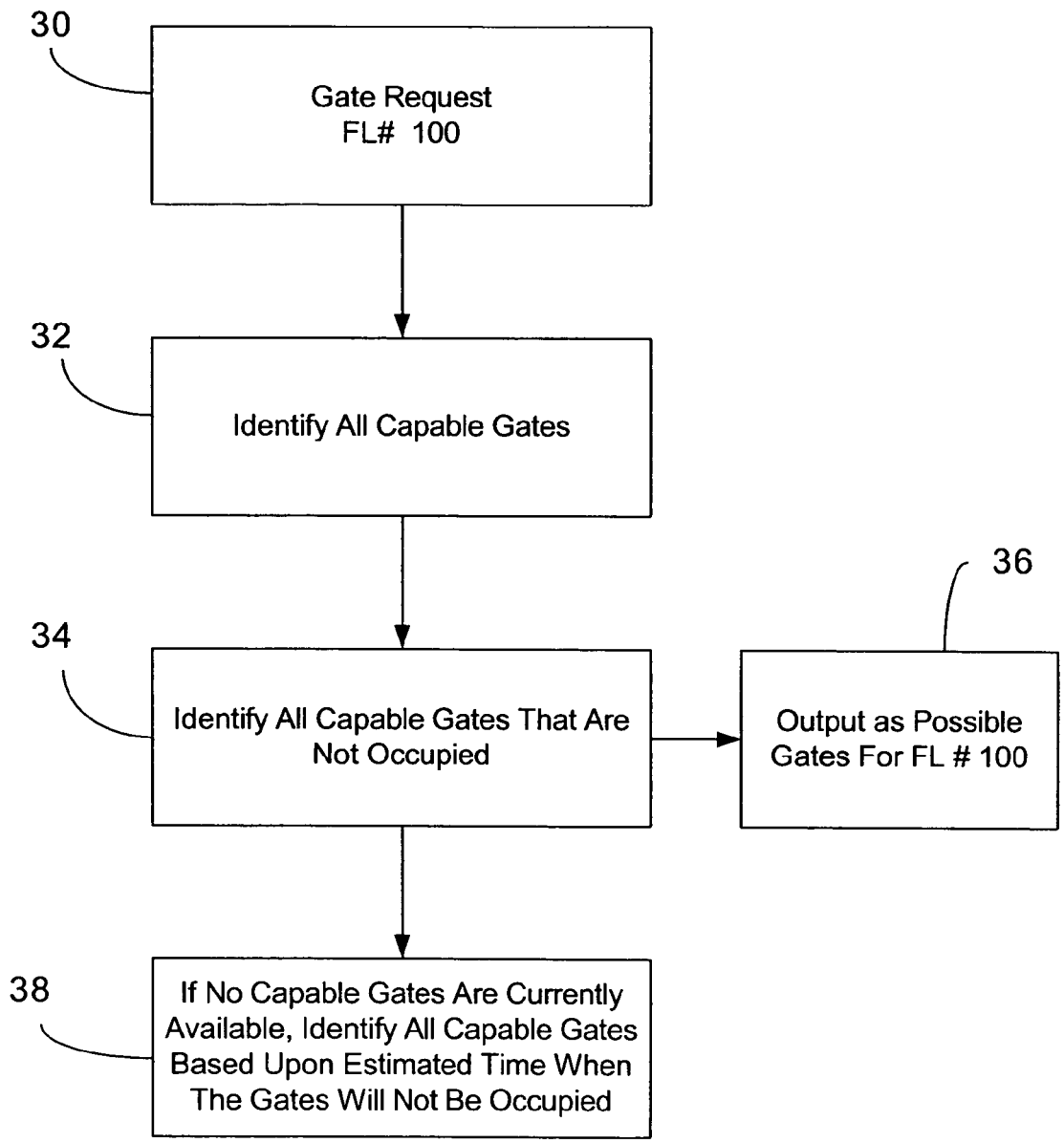
FIG. 3 is a flowchart depicting one illustrative example of a rules-based method that may be employed with the present invention.

FIG. 3 is a flowchart depicting another illustrative rule or algorithm that the system 10 may employ. The algorithm or rule depicted in FIG. 3 may be performed by the system 10 automatically, or it may be the result of a manual request by a user of the system 10. In box 30, the system 10 receives a gate assignment request for flight number 100. Based on the flight information data 18*a*, the system 10 knows all of the necessary information regarding flight 100, e.g., that flight 100 is a Boeing 767 aircraft with 250 passengers on board, etc. In box 32, the system 10, having access to gate information data 18*b*, identifies all gates that are physically capable of handling such an aircraft. In box 34, based upon the gate information data 18*b*, the system identifies which of the capable gates identified in box 32 are not occupied, i.e., it identifies the gates that are ready to accept an aircraft. As indicated in box 36, the identified gates resulting from box 34 are output in response to the gate request. If the situation arises where there are no capable gates (box 32) that are not occupied (box 34), the system 10 may then indicate which of the capable gates identified in box 32 are expected to become available, and the estimated time when such gates will be available, as indicated in box 38. Of course, this is a relatively simple example of the manner in which the integrated system 10, having access to both flight information data 18*a* and gate information data 18*b*, may be employed to improve the effectiveness and efficiency of airport operations. After reading the present application, those skilled in the art will appreciate that many automated rules can be written to facilitate decision making as it relates to managing airport operations.

In one illustrative embodiment, a system for monitoring aircraft/airport operations is disclosed which comprises a controller operatively coupled to a network, a data storage device comprising flight information data that is operatively coupled to the network, a data storage device comprising gate information data that is operatively coupled to the network and at least one user interface wherein a user may access the flight information data and the gate information data.

A method of monitoring aircraft/airport operations is also disclosed which comprises, in one illustrative embodiment, accessing a single integrated system having access to flight information data and gate information data and monitoring at least one activity relating to airport operations based upon information accessed in the single integrated system.

The particular embodiments disclosed above are illustrative only, as the invention may be modified and practiced in different but equivalent manners apparent to those skilled in the art having the benefit of the teachings herein. For example, the process steps set forth above may be performed in a different order. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed:

1. An integrated system for monitoring operations, comprising:
   at least one data storage device that is operatively coupled to a network, said at least one data storage device comprising flight information data, gate information data, and ground equipment status data;
   a controller operatively coupled to the network and operable to generate exception data associated with performance of ground equipment based on said ground equipment status data, said flight information data, and said gate information data; and
   at least one user interface wherein a user may access said flight information data, said gate information data, said ground equipment status data, and said exception data.

2. The system of claim 1, wherein said at least one data storage device comprises gate scheduling data and wherein said user may also access said gate scheduling data.

3. The system of claim 1, wherein said at least one data storage device comprises facility information data and wherein said user may also access said facility information data.

4. The system of claim 1, wherein said at least one data storage device comprises equipment maintenance data and wherein said user may also access said equipment maintenance data.

5. The system of claim 1, wherein said at least one data storage device comprises multiple data storage devices.

6. An integrated system for monitoring operations, comprising:
   a controller operatively coupled to a network;
   at least one data storage device that is operatively coupled to said network, said at least one data storage device comprising flight information data, gate information data, gate scheduling data, and ground equipment status data;
   at least one user interface wherein a user may access said flight information data, said gate information data, said gate scheduling data, and said ground equipment status data; and
   at least one device for generating a report of exception conditions associated with performance of ground equipment within said system based upon at least said flight information data, said gate information data, and said ground equipment status data.

7. The system of claim 6, wherein said at least one data storage device comprises facility information data and wherein said user may also access said facility information data.

8. The system of claim 6, wherein said at least one data storage device comprises equipment maintenance data and wherein said user may also access said equipment maintenance data.

9. A method, comprising:
   accessing a single integrated system having access to flight information data, gate information data, and ground equipment status data; and
   monitoring at least one activity relating to aircraft/airport operations associated with performance of ground equipment based upon information accessed in said single integrated system.

10. The method of claim 9, wherein accessing said single integrated system having access to flight information data and gate information data comprises accessing said single integrated system having access to flight information data, gate information data and gate scheduling data.

11. The method of claim 9, wherein accessing said single integrated system having access to flight information data and gate information data comprises accessing said single integrated system having access to flight information data, gate information data and facility information data.

12. The method of claim 9, wherein accessing said single integrated system having access to flight information data and gate information data comprises accessing said single integrated system having access to flight information data, gate information data and equipment maintenance data.

13. The method of claim 9, further comprising taking at least one corrective action based upon said monitoring of said at least one activity.

14. The method of claim 9, further comprising identifying an exception condition based upon said monitoring of said at least one activity.

15. The method of claim 14, further comprising identifying a cause of said exception condition.

16. A method, comprising:
   accessing a single integrated system having access to flight information data, gate information data, gate scheduling data, and ground equipment status data;
   monitoring at least one activity relating to aircraft/airport operations associated with performance of ground equipment based upon information accessed in said single integrated system; and
   identifying an exception condition based upon said monitoring of said at least one activity.

17. The method of claim 16, wherein accessing said single integrated system having access to flight information data, gate information data and gate scheduling data comprises accessing a single integrated system having access to flight information data, gate information data, gate scheduling data and facility information data.

18. The method of claim 16, wherein accessing said single integrated system having access to flight information data and gate information data comprises accessing a single integrated system having access to flight information data, gate information data, gate scheduling data and equipment maintenance data.

19. The method of claim 16, further comprising taking at least one corrective action based upon said monitoring of said at least one activity.

20. The method of claim 16, further comprising identifying a cause of said exception condition.

21. A method, comprising:
accessing a single integrated system having access to flight information data, gate information data, gate scheduling data, and ground equipment status data;
monitoring at least one activity relating to aircraft/airport operations associated with performance of ground equipment based upon information accessed in said single integrated system; and
taking at least one corrective action based upon said monitoring of said at least one activity.

22. The method of claim 21, wherein accessing said single integrated system having access to flight information data, gate information data and gate scheduling data comprises accessing a single integrated system having access to flight information data, gate information data, gate scheduling data and facility information data.

23. The method of claim 21, wherein accessing said single integrated system having access to flight information data and gate information data comprises accessing a single integrated system having access to flight information data, gate information data, gate scheduling data and equipment maintenance data.

24. A method, comprising:
accessing a single integrated system having access to flight information data, gate information data, and ground equipment status data; and
establishing rules associated with performance of ground equipment within said system to identify exception conditions that occur within said system.

25. The method of claim 24, wherein accessing a single integrated system having access to flight information data and gate information data comprises accessing a single integrated system having access to flight information data, gate information data and gate scheduling data.

26. The method of claim 24, wherein accessing a single integrated system having access to flight information data and gate information data comprises accessing a single integrated system having access to flight information data, gate information data and facility information data.

27. The method of claim 24, wherein accessing a single integrated system having access to flight information data and gate information data comprises accessing a single integrated system having access to flight information data, gate information data and equipment maintenance data.

28. The method of claim 24, further comprising indicating that an exception condition has occurred.

29. The method of claim 28, farther comprising taking at least one corrective action based upon said indication that an exception condition has occurred.

30. A method, comprising:
accessing a single integrated system having access to flight information data, gate information data, gate scheduling data, and ground equipment status data;
establishing rules associated with performance of ground equipment within said system to identify exception conditions that occur within said system; and
taking at least one corrective action based upon said indication that an exception condition has occurred.

31. The method of claim 30, wherein accessing a single integrated system having access to flight information data, gate information data and gate scheduling data comprises accessing a single integrated system having access to flight information data, gate information data, gate scheduling data and facility information data.

32. The method of claim 30, wherein accessing a single integrated system having access to flight information data, gate information data and gate scheduling data comprises accessing a single integrated system having access to flight information data, gate information data, gate scheduling data and equipment maintenance data.

* * * * *